United States Patent [19]
Schueler

[11] Patent Number: 5,682,034
[45] Date of Patent: Oct. 28, 1997

[54] DUAL USE SENSOR DESIGN FOR ENHANCED SPATIORADIOMETRIC PERFORMANCE

[75] Inventor: Carl F. Schueler, Santa Barbara, Calif.

[73] Assignee: Hughes Aircraft Company, Los Angeles, Calif.

[21] Appl. No.: 590,004

[22] Filed: Jan. 23, 1996

[51] Int. Cl.$^6$ .................................................. H01J 3/14
[52] U.S. Cl. ...................... 250/234; 250/208.1; 348/295
[58] Field of Search ............................... 250/234–236, 250/208.1–208.3; 348/294, 295, 281–283

[56] References Cited

U.S. PATENT DOCUMENTS

| | | | |
|---|---|---|---|
| 4,280,141 | 7/1981 | McCann et al. | 348/295 |
| 5,371,358 | 12/1994 | Chang et al. | 250/236 |

*Primary Examiner*—Que Le
*Attorney, Agent, or Firm*—W. C. Schubert; W. K. Denson-Low

[57] ABSTRACT

A scanning detection system. The inventive system includes a detector arrangement for scanning a target surface over a predetermined angular range and providing a plurality of sampled signals in response thereto. The detector outputs are sampled and aggregated to provide a first output having a constant spatial resolution independent of the scan angle of the detector. The detector outputs are also aggregated to provide a second output having fine radiometric sensitivity. In a specific implementation, constant resolution is achieved by co-adding a variable number of adjacent detector samples where the number of adjacent samples co-added is dependent on the scan angle. Fine radiometric sensitivity is achieved by co-adding a fixed number of adjacent samples. Thus, dual capabilities of constant resolution and high sensitivity are achieved in a cost effective manner.

16 Claims, 3 Drawing Sheets

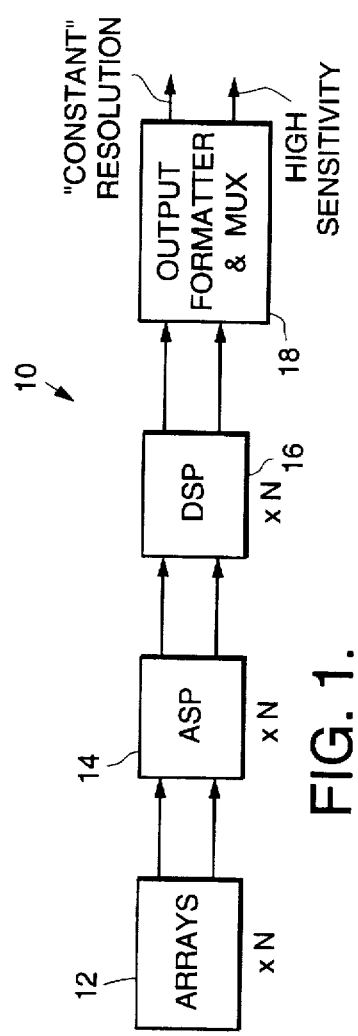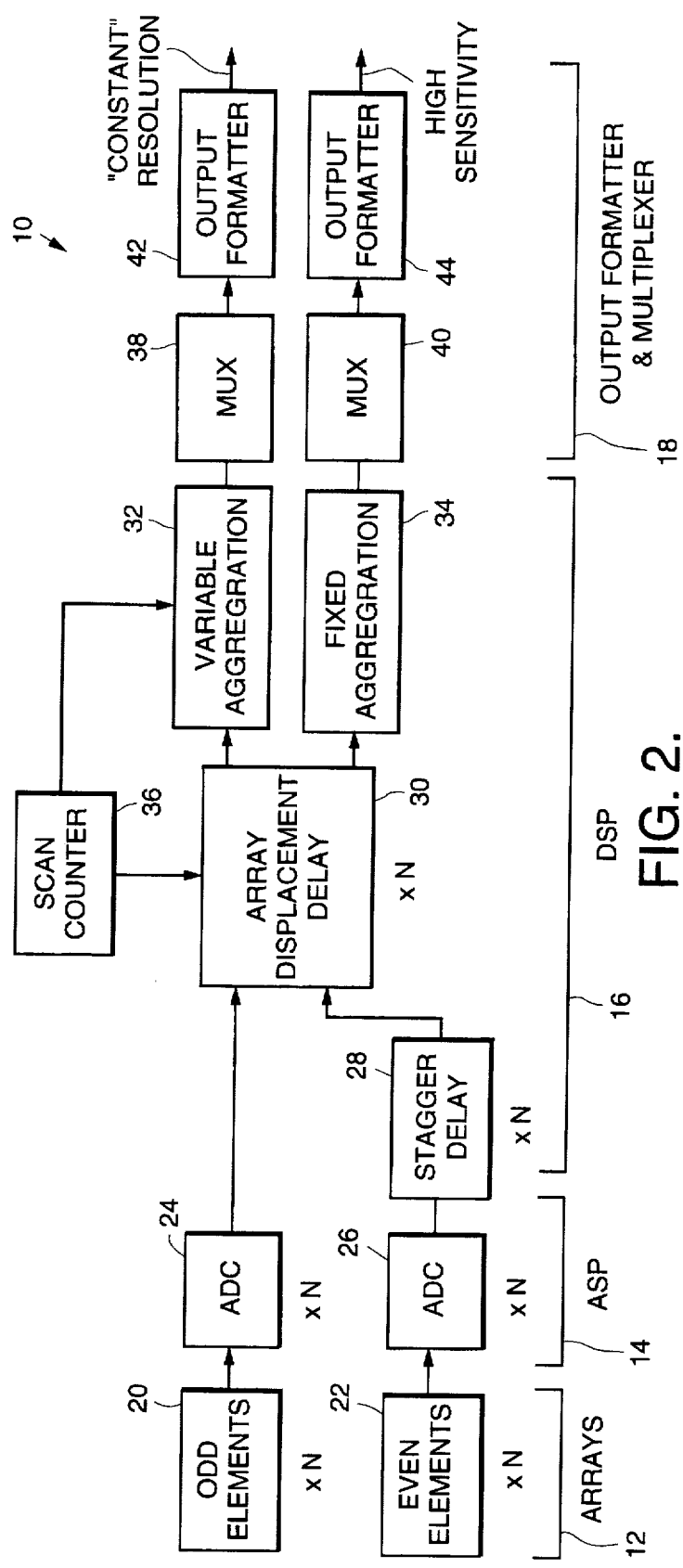

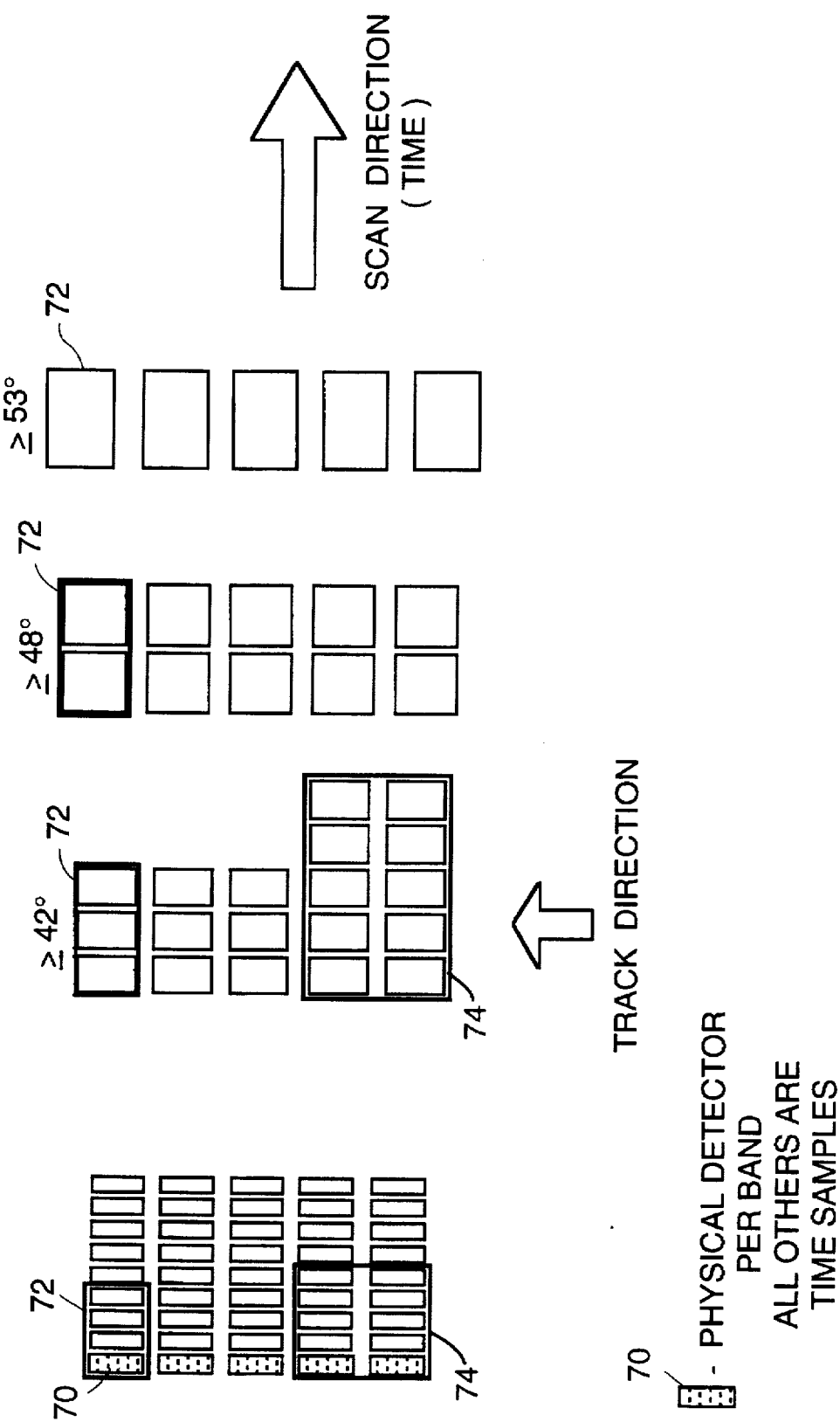

DUAL USE SENSOR DESIGN FOR ENHANCED SPATIORADIOMETRIC PERFORMANCE

BACKGROUND OF THE INVENTION

1. Field of the Invention

The present invention relates to the design and manufacture of imaging systems. More specifically, the present invention relates to the design and manufacture of scanning sensor arrays.

2. Description of the Related Art

Scanning radiometers and other electro-optical detection instruments typically utilize a detector (or set of detectors) which are adapted to receive radiant energy directly or by reflection from a scan mirror. In angular scanning systems, the scanning mechanism traverses a scan angle on either side of a line in the middle of the angular scanning range. This line is known in the art as the nadir.

At a given scan angle, the field of view of the detector projects a footprint onto the scanned surface which is the instantaneous size of the projected detector image on the surface. In most applications, the scanned surface is either planar or curved in such a way that as the scan angle increases, the area of the footprint increases from a minimum at the nadir to a maximum at a maximum scan angle.

The growth of the footprint as a function of the scan angle inhibits the ability of airborne and satellite borne scanning radiometers to achieve a constant ground spatial resolution at large scan angles off of the nadir. This presents a particular problem in applications where there is a need to examine a fixed area on the scanned surface with a field of view of constant spatial resolution irrespective of scan angle.

One prior approach to the constant footprint problem includes limiting the scan angle to provide a substantially constant field of view close to the nadir. This approach, however, requires more time to cover the same surface area. Accordingly, its slow speed may force other compromises on the system making it undesirable for many applications.

Another approach is embodied in the Defense Meteorological Satellite Program's (DMSP) operational linescan system (OLS) radiometer. The OLS radiometer attempted to achieve a constant ground footprint in the scan (and track) direction by changing the size of the instantaneous field of view (IFOV) as a function of scan angle. The OLS radiometer used a combination of techniques including switching to smaller detector sizes during the scan and use of rectangular detectors whose instantaneous field of view rotated with the scan. However, the degree of constant spatial resolution achieved was limited and the radiometric resolution was compromised.

Thus, there was a need in the art for an improved method and apparatus for use in scanning radiometers which would be effective to maintain a constant footprint (i.e., an area of constant spatial resolution) at a target surface at large scan angles off nadir, without limiting the instantaneous field of view of the detector nor the radiometric resolution thereof.

The need was met by U.S. Pat. No. 4,837,431, issued Jun. 6, 1989, to Malinowski et at., and entitled VARIABLE PHASE TIME DELAY AND SIGNAL AGGREGATION SYSTEM AND METHOD FOR ACHIEVING CONSTANT SPATIAL RESOLUTION IN SCANNING DETECTION INSTRUMENTS, the teachings of which are incorporated herein by reference. The system is adapted for use in scanning detection systems and serves to maintain approximately constant detector spatial resolution on a target surface independent of scan angle. Output signals from the detector elements are selectively clocked to phase the relative timing thereof as a function of scan angle. The signals are aggregated to generate a combined output signal having a desired spatial resolution.

While Malinowski's system substantially met the above-identified need in the art, for certain applications, a single instrument which affords constant spatial resolution and fine radiometric sensitivity is desired. This is difficult to achieve from a single instrument without a large optical aperture, which increases sensor size, weight and cost. Therefore, there is an ongoing need in the art for a single instrument which provides constant resolution and fine radiometric sensitivity, which avoids the need for larger optics.

SUMMARY OF THE INVENTION

The need in the art is addressed by the scanning detection system of the present invention. In a most general implementation, the inventive system includes a detector arrangement for scanning a target surface over a predetermined angular range and providing a plurality of sampled signals in response thereto. The detector outputs are sampled and aggregated to provide a first output having a constant spatial resolution independent of the scan angle of the detector. The detector outputs are also aggregated to provide a second output having fine radiometric sensitivity.

In a specific implementation, constant resolution is achieved by co-adding a variable number of adjacent detector samples where the number of adjacent samples co-added is dependent on the scan angle. Fine radiometric sensitivity is achieved by co-adding a fixed number of adjacent samples.

Thus, dual capabilities of constant resolution and high sensitivity are achieved in a cost effective manner.

BRIEF DESCRIPTION OF THE DRAWINGS

FIG. 1 is a high level block diagram of an illustrative implementation of the scanning detection system of the present invention.

FIG. 2 is a second level block diagram of the illustrative implementation of the scanning detection system of the present invention for a single band or channel of the focal plane array.

FIG. 4(a) is representative of the ground projection of the instantaneous field of view of the scanning detection system of the present invention at nadir.

FIG. 4(b) is representative of the ground projection of the instantaneous field of view of the scanning detection system of the present invention at 42° from nadir.

FIG. 4(c) is representative of the ground projection of the instantaneous field of view of the scanning detection system of the present invention at 48° from nadir.

FIG. 4(d) is representative of the ground projection of the instantaneous field of view of the scanning detection system of the present invention at 53° from nadir.

DESCRIPTION OF THE INVENTION

Figure 3:
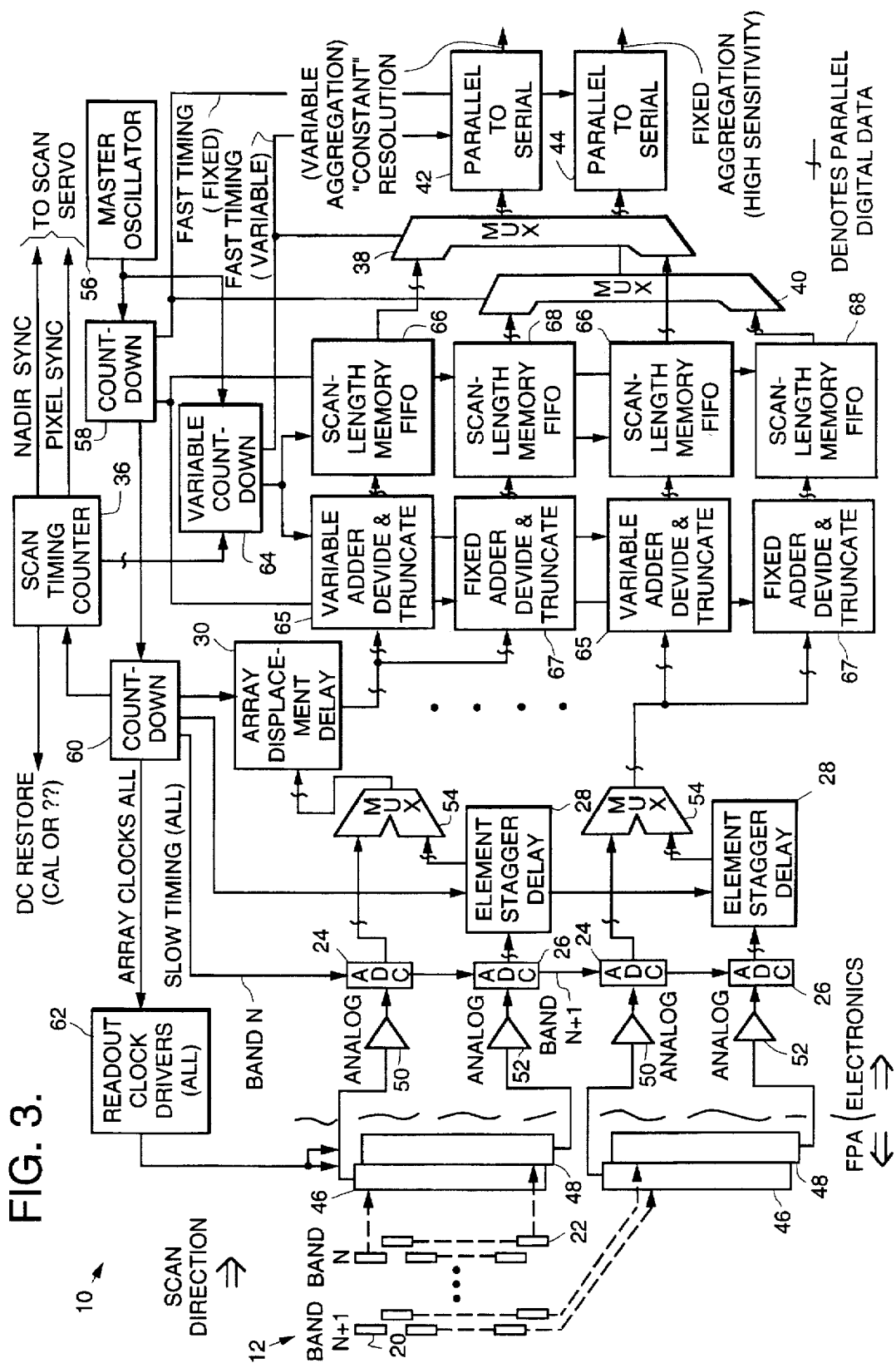
FIG. 3 is a detailed block diagram of the illustrative implementation of the scanning detection system of the present invention showing multiple bands of the focal plane array.

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

FIG. 1 is a high level block diagram of an illustrative implementation of the scanning detection system of the present invention. The system 10 includes a conventional focal plane array and scanning mechanism denoted generally at 12, an analog signal processor (ASP) 14, a digital signal processor (DSP) 16, and an output formatter 18.

FIG. 2 is a second level block diagram of the illustrative implementation of the scanning detection system of the present invention for a single band or channel of the focal plane array. As depicted in FIG. 2, the focal plane array 12 is divided into odd elements 20 and even elements 22. The odd elements feed a first analog to digital converter (ADC) 24 of the ASP 14 and the even elements of the array 12 feed a second analog to digital converter 26 of the ASP 14. A stagger is provided in the physical juxtaposition between the odd and even detectors commonly utilized to minimize detector spacing in the cross-scan direction. In the illustrative implementation, the stagger is removed by delaying the output of the even elements by a stagger delay (typically a buffer memory) 28 in the DSP 16. The output of the first ADC 24 and the stagger delay 28 are provided to a second delay memory 30 in the DSP 16.

A first output of the displacement memory 30 is provided to a first aggregation circuit 32 which varies the number of adjacent samples co-added based on the scan angle of the focal plane array 12, provided by a scan counter 36, in accordance with present teachings as discussed more fully below.

A second output of the displacement memory 30 is provided to a second aggregation circuit 34 which co-adds a fixed number of adjacent samples from the array 12.

The outputs of the first and second aggregation circuits 32 and 34 are multiplexed to first and second output formatters (42 and 44) which provide constant resolution and high sensitivity respectively.

FIG. 3 is a detailed block diagram of the illustrative implementation of the scanning detection system of the present invention showing multiple bands of the focal plane array. The focal plane array (FPA) of detector elements 12 includes n bands of elements where n ranges from 1 to N+1. In each band, the odd elements 20 are connected to an odd element multiplexer 46 and the even elements 22 are connected to an even element multiplexer 48. The odd and even element multiplexers are provided on the FPA 12.

For each band n, a first analog buffer amplifier 50 couples signals from the odd element multiplexer 46 to the first ADC 24 and a second analog buffer amplifier 52 couples signals from the even element multiplexer 48 to the second ADC 26. The output from the first ADCs 24 are provided directly to a multiplexer 54. The output of the second ADCs 26 are provided to the stagger delay memory 28. The output of the stagger delay circuits 28 provide the second input to each associated multiplexer 54. The outputs of the first N multiplexers 54 are provided 16 an array displacement memory 30 associated with each of the first N bands. The output of the N+1 band multiplexer 54 is not delayed on the receipt of the N+1st band of data. The data from all of the N+1 bands is presented simultaneously to the first and second aggregation circuits 32 and 34 (variable and fixed add, divide and truncate circuits 65–68 below).

A master oscillator 56 provides a fast timing pulse train to a first countdown counter 58 which divides the pulse train by a first number. The output of the first countdown counter 58 provides intermediate timing clock pulses to aggregation and output circuits and to a second countdown counter 60. The second countdown counter 60 divides down the output of the first countdown counter 58 and provides slow timing clock signals to the displacement memories 30, the stagger delay circuits 28, the ADC circuits 24, 26 and to readout clock drivers 62. In addition, the second countdown counter 60 provides an input to the scan timing counter 36.

The scan timing counter 36 provides nadir and pixel synch signals to an FPA scan servo (not shown) and to the variable countdown counter 64. The variable countdown counter 64 also receives the pulse train from the master oscillator 56. On receipt of the fast timing pulse train from the master oscillator, the variable countdown circuit, which may be implemented with commercially available digital technology such as gate array or ASICs, provides variable intermediate timing signals to the variable aggregation circuits 32. In addition, the variable countdown circuit 64 provides variable fast timing signals to variable aggregation multiplexer 38 and the associated output formatter 42 which may be implemented as a parallel to serial multiplexer.

For each band or channel, the variable aggregation circuit 32 is implemented with a variable digital adder, divider and truncation circuit 65 and a scan length first-in, first-out (FIFO) memory 66. The digital adder 65 co-adds a variable number of adjacent detector samples in response to the variable timing signals received from the variable countdown circuit 64. These signals are stored in the associated scan length FIFO memory 66. The output of the first scan length memory 66 for each channel is provided to the variable aggregation multiplexer 38. The output of the variable aggregation multiplexer is provided to the output formatter 42.

Similarly, for each channel, the fixed aggregation circuit 34 is implemented with a fixed digital add, divide and truncate circuit 67 and a second scan length FIFO memory 68. The fixed digital adders 67 add fixed number of adjacent detector samples in response to the intermediate fixed timing signal from the first countdown circuit 58. These signals are stored in associated scan length FIFO memories 68. The output of each of the scan length memories 68 are provided to the fixed aggregation multiplexer 40. The output of the fixed aggregation multiplexer 40 is provided to the second output formatter 44.

FIG. 4(a) is representative of the ground projection of the instantaneous field of view (IFOV) of the scanning detection system of the present invention at nadir. The footprint of a single detector is shown at 70. The variable aggregation (VA) pixel 72 is shown as the result of the co-addition of four adjacent detector samples and the fixed aggregation pixel (FA) 74 is shown as the result of the co-addition of 10 adjacent detector samples.

FIG. 4(b) is representative of the ground projection of the instantaneous field of view of the scanning detection system of the present invention at 42° from nadir. Here, the variable aggregation pixel 72 is shown as the result of the co-addition of three adjacent detector samples and the fixed aggregation pixel (FA) 74 is shown as the result of the co-addition of 10 adjacent detector samples.

FIG. 4(c) is representative of the ground projection of the instantaneous field of view of the scanning detection system of the present invention at 48° from nadir. In this figure, the VA pixel 72 results from the co-addition of two adjacent samples and the FA pixel 74 is not shown.

FIG. 4(d) is representative of the ground projection of the instantaneous field of view of the scanning detection system of the present invention at 53° from nadir. In this figure, the VA pixel 72 is one detector footprint in size. Again, the FA pixel 74 is not shown.

As illustrated in FIGS. 4(a–d), the invention provides a constant resolution output signal corresponding to the VA pixel 72 and a high sensitivity output pixel corresponding to the FA pixel 74. This should afford approximately a factor of two reduction in the aperture diameter needed by the instrument to achieve both constant resolution and high sensitivity. This translates to an approximate factor of three reduction in volume, weight, and cost of the instrument and allows for an instrument of comparable size to an instrument designed to provide only constant resolution.

Features of the invention include:

1) Common focal plane array clocking eliminates separate timing for dual data sets;

2) Low speed analog to digital conversion (ADC) processing achieves low power with excellent accuracy;

3) Separation of odd and even processing offers graceful degradation in event of failures;

4) Post ADC processing is performed by logic blocks implementable with either gate array or ASIC technology. ASIC is feasible due to highly parallel architecture;

5) Post ADC processing provides graceful degradation as well and operates at low speed to conserve power and provide reliability;

6) Noninteger IFOV timing is easily implemented which allows control by ground command to modify timing to adjust operation; and 7) Parallel timing-registered data allows easy data-compression in two dimensions, if desired.

Thus, the present invention has been described herein with reference to a particular embodiment for a particular application. Those having ordinary skill in the art and access to the present teachings will recognize additional modifications applications and embodiments within the scope thereof.

It is therefore intended by the appended claims to cover any and all such applications, modifications and embodiments within the scope of the present invention.

Accordingly,

What is claimed is:

1. A scanning detection system comprising:
   detector means for scanning a target surface over a predetermined angular range and providing a plurality of sampled signals in response thereto;
   first means for aggregating said sampled signals to provide a first output signal of predetermined constant spatial resolution independent of the scan angle of the detector means; and
   second means for aggregating said sampled signals to provide a second output signal of predetermined radiometric sensitivity of said detector means.

2. The invention of claim 1 wherein said first means includes means for combining a variable number of adjacent detector samples dependent on the scan angle of said detector means.

3. The invention of claim 2 wherein said means for combining includes means for providing a scan position signal.

4. The invention of claim 3 wherein said means for combining further includes means for providing a count in response to said scan position signal.

5. The invention of claim 4 wherein said means for combining further includes means for co-adding a number of adjacent detector samples, said number being determined by said count.

6. The invention of claim 5 wherein said means for combining further includes means for storing the result of the addition of said number of adjacent detector samples.

7. The invention of claim 1 wherein said second means includes means for combining a fixed number of adjacent detector samples independent of the scan angle of said detector means.

8. The invention of claim 7 wherein said means for combining further includes means for co-adding a fixed number of adjacent detector samples.

9. The invention of claim 8 wherein said means for combining further includes means for storing the result of the addition of said fixed number of adjacent detector samples.

10. A scanning detection system comprising:
    detector means for scanning a target surface over a predetermined angular range and providing a plurality of sampled signals in response thereto;
    first aggregating means for combining said sampled signals to provide a first output signal of predetermined constant spatial resolution independent of the scan angle of the detector means, said first means including means for adding a variable number of adjacent detector samples dependent on the scan angle of said detector means; and
    second aggregating means for combining said sampled signals to provide a second output signal of predetermined radiometric sensitivity of said detector means, said second aggregating means including means for adding a fixed number of adjacent detector samples independent of the scan angle of said detector means.

11. The invention of claim 10 wherein said first aggregating means includes means for providing a scan position signal.

12. The invention of claim 11 wherein said first aggregating means further includes means for providing a count in response to said scan position signal.

13. The invention of claim 12 wherein said first aggregating means further includes means for co-adding a number of adjacent detector samples, said number being determined by said count.

14. The invention of claim 13 wherein said second aggregating means further includes means for storing the result of the addition of said fixed number of adjacent detector samples.

15. The invention of claim 14 further including means for storing the result of the additions of said adjacent detector samples.

16. A scanning method including the steps of:
    scanning a target surface over a predetermined angular range and providing a plurality of sampled signals in response thereto;
    aggregating said sampled signals to provide a first output signal of predetermined constant spatial resolution independent of the scan angle of a detector; and
    aggregating said sampled signals to provide a second output signal of predetermined radiometric sensitivity of said detector means.

* * * * *